March 12, 1935.    G. M. BICKNELL    1,994,011

INTAKE MANIFOLD

Filed Feb. 15, 1933

GEORGE M. BICKNELL
*INVENTOR*

BY F. H. Gibbs

*ATTORNEY*

Patented Mar. 12, 1935

1,994,011

UNITED STATES PATENT OFFICE 1,994,011

INTAKE MANIFOLD

George M. Bicknell, St. Louis, Mo., assignor to Carter Carburetor Corporation, St. Louis, Mo., a corporation of Delaware Application February 15, 1933, Serial No. 656,823

6 Claims. (Cl. 123—52)

It will be understood that the invention is susceptible of many modifications, and, accordingly, I do not wish to be limited in my protection, except as set forth in the accompanying claims.

This invention relates to intake manifolds for internal combustion engines and more particularly to devices for improving the vaporization and distribution in multiport manifolds, and in certain cases to governing the maximum capacity of such manifolds.

It is a well known fact that a substantial part of the fuel passing thru an intake manifold is likely to be in the form of droplets of liquid fuel which has either not been vaporized at all or which has been recondensed due to the contact of the vapor with the cold walls of the manifold. As a remedy for this, some manifolds have been constructed with the passageways provided with sharp corners at each turn to set up a turbulent condition in the mixture stream. This is not entirely satisfactory, however, particularly with regard to the inlet port of the manifold for a certain portion of the liquid fuel will follow the contour of the square corner and continue to flow along the walls of the manifold.

According to my invention, I form the inlet port of the manifold with a gradually expanding wall which is curved or tapered to meet the longitudinal passageway in the intake manifold, and I then insert a thin sheet metal sleeve in the intake port of sufficient length to extend inwardly and terminate beyond the beginning of the expansion of the intake port. By this means droplets of liquid fuel forming on the cylindrical sleeve have no opportunity to come in contact with the wall of the manifold. In order for the droplets to reach the main wall of the manifold they must trickle down the inner wall of the sheet metal sleeve and drip off into the air stream, during which process they are usually vaporized. There is, of course, no tendency for the droplets to flow back upwardly on the outside of the sheet metal sleeve to the point where the outside of the sleeve contacts with the expanding wall of the intake port.

The invention will be better understood upon reference to the following specification and accompanying drawing, referring to which:

Figure 1:
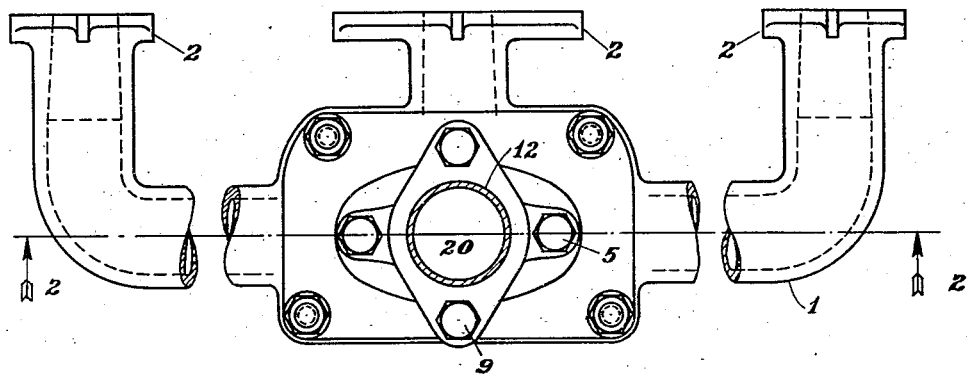
Figure 1 shows a plan view of a manifold according to my invention.

The reference numeral 1 indicates an intake manifold of the three-port type, although it will be understood that the invention could be applied to a manifold having a different number of discharge ports. Conventional flanges are provided at 2 for attaching the manifold to the intake ports of an engine. The intake port 20 of the manifold is surrounded by an exhaust gas passage 3, thru which is circulated exhaust gases from the motor. The inlet and outlet connections are conventional and are not shown. A carburetor supporting member or cover plate 4 is attached to the manifold by suitable bolts 5. Registering passages 6 and 7 respectively are formed in the member 4 and intake manifold respectively. It will be understood that these passages are normally cylindrical in formation and form the intake passageway of the intake manifold. The outlet ports are indicated at 21. A carburetor 8 is attached to the supporting member 4 by suitable bolts 9 and in this case it will be noted that the carburetor is of the downdraft type.

A hollow cylindrical sleeve 10 provided with a flange 11 at its upper end is fitted into the intake passageway of the intake manifold and forms a continuation of the main carburetor passage 12.

In the construction shown in Figure 2 the sleeve 10 is just of sufficient length to extend down below the cylindrical portion of the passageway 7, so that liquid fuel adhering to and running down the inner walls of the sleeve 10 will be dropped into the air stream and not permitted to drain along the curved surfaces 13 toward whichever end of the manifold happens to be the lowest.

Figure 3:
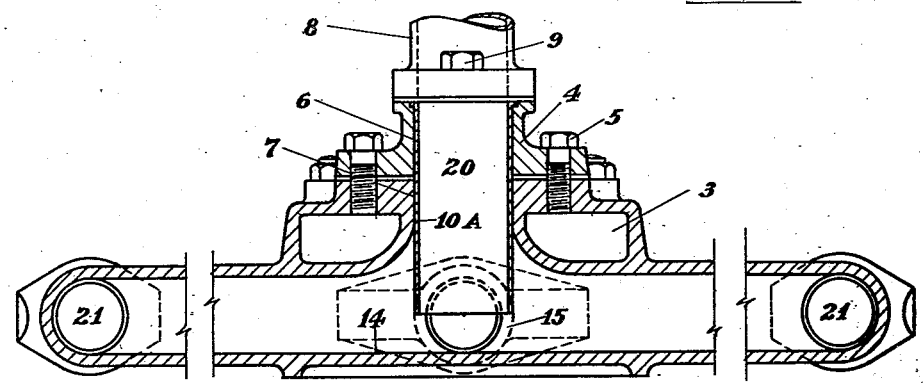
Figure 3 is a view similar to Figure 2 showing a slightly modified form of directing sleeve.
Figure 4:
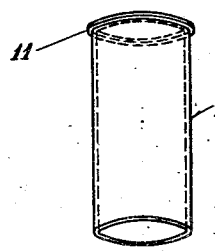
Figure 4 is a perspective view of the directing sleeve.

In the construction shown in Figure 3, the sleeve 10—A is made of such length as to extend downwardly into proximity with the bottom wall 14 of the intake manifold, thereby forming a restriction limiting the maximum capacity of the manifold and increasing the rate of flow of gaseous fuel mixture at the point generally indicated by the reference numeral 15. By this arrangement the distribution is not only improved, but an effective governing device is also provided.

Figure 2:
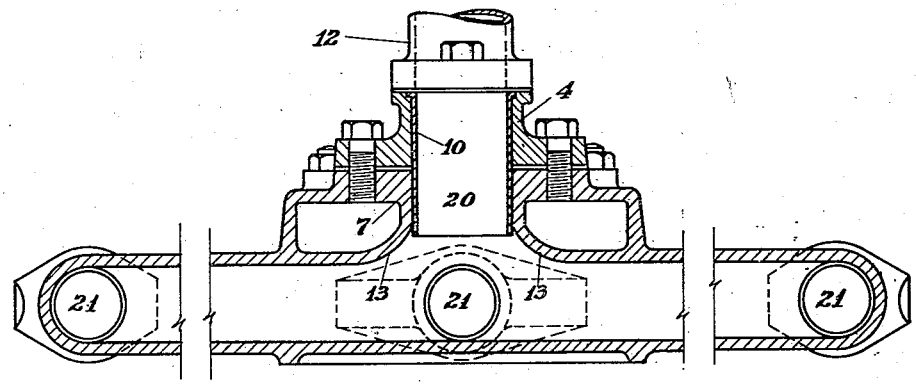
Figure 2 is a vertical sectional view taken along the lines 2—2 of Figure 1.

In operation, with the device as shown in Figure 2 an increase in distribution, vaporization and general fuel economy is obtained on account of the fact that the unvaporized fuel which happens to adhere to the wall of the sleeve 10 is not permitted to drain directly down along the walls of the intake manifold to the end port at whichever end happens to be the lowest. The fact that the fuel is forced to drip off into the air stream is a substantial factor in improving both distribution and vaporization.

With the construction shown in Figure 3 the high velocity obtainable by restricting the fuel mixture passage at the point 15 assists in greatly improving vaporization and distribution hereby greater economy is affected, particularly at low speeds and heavy loads. The restriction of the fuel mixture passageway at this point does not materially interfere with the total quantity of fuel supplied to the engine at low speeds even with wide open throttle, but at higher speeds the restriction prevents a full charge of fuel mixture being supplied to the cylinders and thereby serves as a very effective governor for the engine.

I claim:

1. In an internal combustion engine, a multi-port intake manifold, having a fuel mixture inlet in the upper part thereof and a hollow cylindrical sleeve having unbroken walls extending downwardly thru said intake port and terminating in a single plane at a point below the upper wall thereof.

2. In an internal combustion engine, an intake manifold comprising a substantially horizontal conduit having a plurality of outlet ports and an inlet port in the upper part thereof, said intake port tapering downwardly and outwardly as it joins said conduit and a downwardly extending fixed sleeve extending into said intake port and terminating at a point below the beginning of the downward and outward taper thereof.

3. In an internal combustion engine, an intake manifold having a plurality of outlet ports connected by a substantially horizontal conduit, an intake port in the upper side of said horizontal conduit, said intake port expanding downwardly and outwardly as it joins said horizontal conduit, and a fixed sleeve extending downwardly into said inlet port and terminating below the point at which the expansion of the inlet port begins.

4. In an internal combustion engine, an intake manifold having a plurality of outlet ports connected by a substantially horizontal conduit, an inlet port in the upper side of said horizontal conduit, a substantially cylindrical fixed sleeve extending downwardly into said inlet port, the lower end of said sleeve being substantially spaced at all times from the walls of said inlet port.

5. In an internal combustion engine, an intake manifold having an inlet port and a plurality of outlet ports connected by a conduit, a sleeve fitted into said inlet port and extending into said conduit, said sleeve being of such length as to substantially restrict said conduit and being stationary with respect thereto.

6. In an internal combustion engine, an intake manifold having a plurality of outlet ports connected by a main conduit, a mixture inlet port substantially at right angles to said main conduit, and a sleeve mounted in a fixed position within said inlet port, said sleeve extending into said main conduit and terminating at a point so near the opposite wall of the main conduit as to substantially restrict the flow of mixture thru said sleeve.

GEORGE M. BICKNELL.